Figure 1:
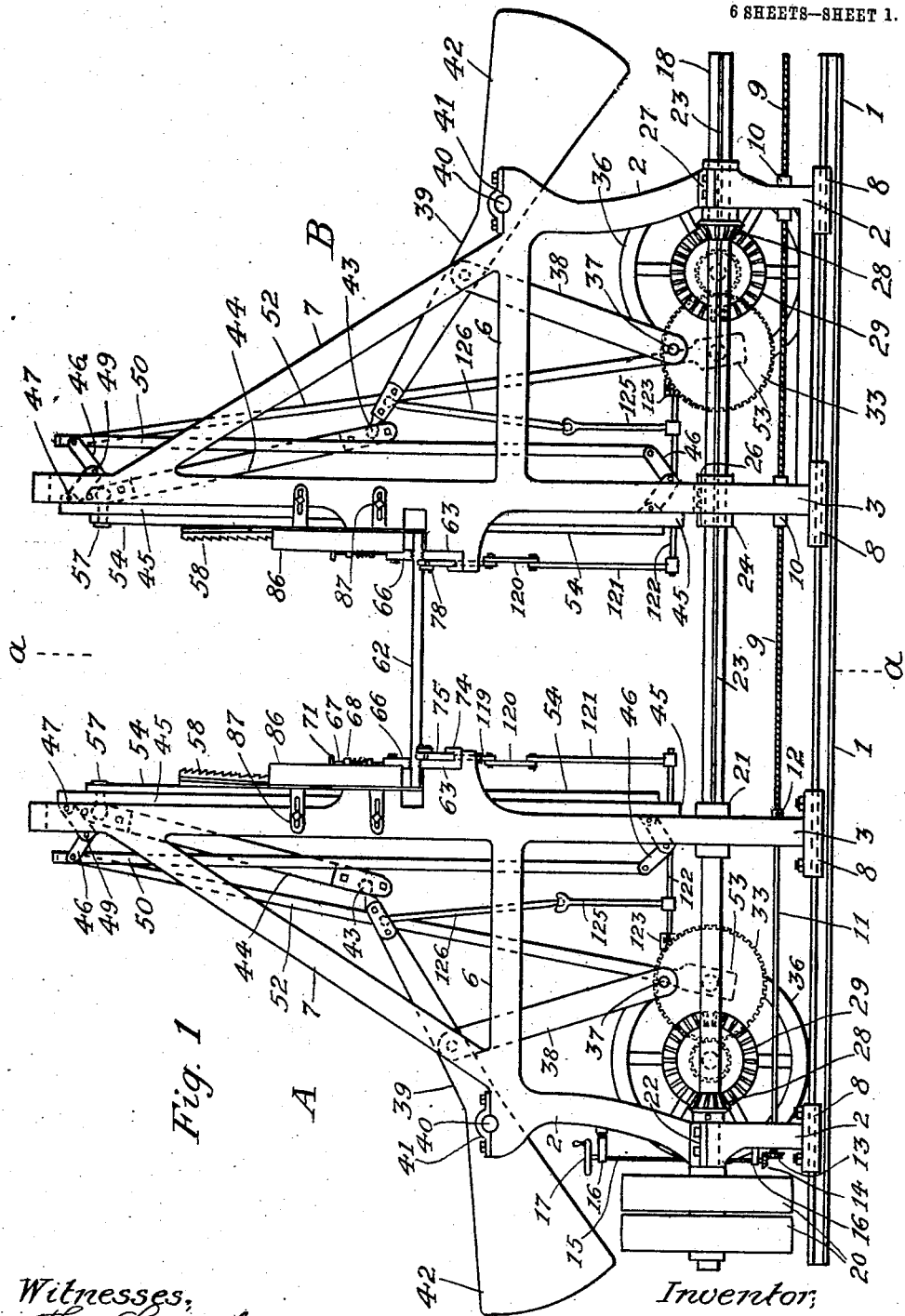

No. 854,410. PATENTED MAY 21, 1907.
J. E. ERICKSON.
SELF FEED FOR MORTISE AND TENON SAWING MACHINES.
APPLICATION FILED JAN. 15, 1907.

6 SHEETS—SHEET 1.

Witnesses:
Theo. Legrand
H. A. Bowman

Inventor:
John E. Erickson
By P. H. Gunckel
his Attorney.

No. 854,410. PATENTED MAY 21, 1907.
J. E. ERICKSON.
SELF FEED FOR MORTISE AND TENON SAWING MACHINES.
APPLICATION FILED JAN. 15, 1907.
6 SHEETS—SHEET 2.
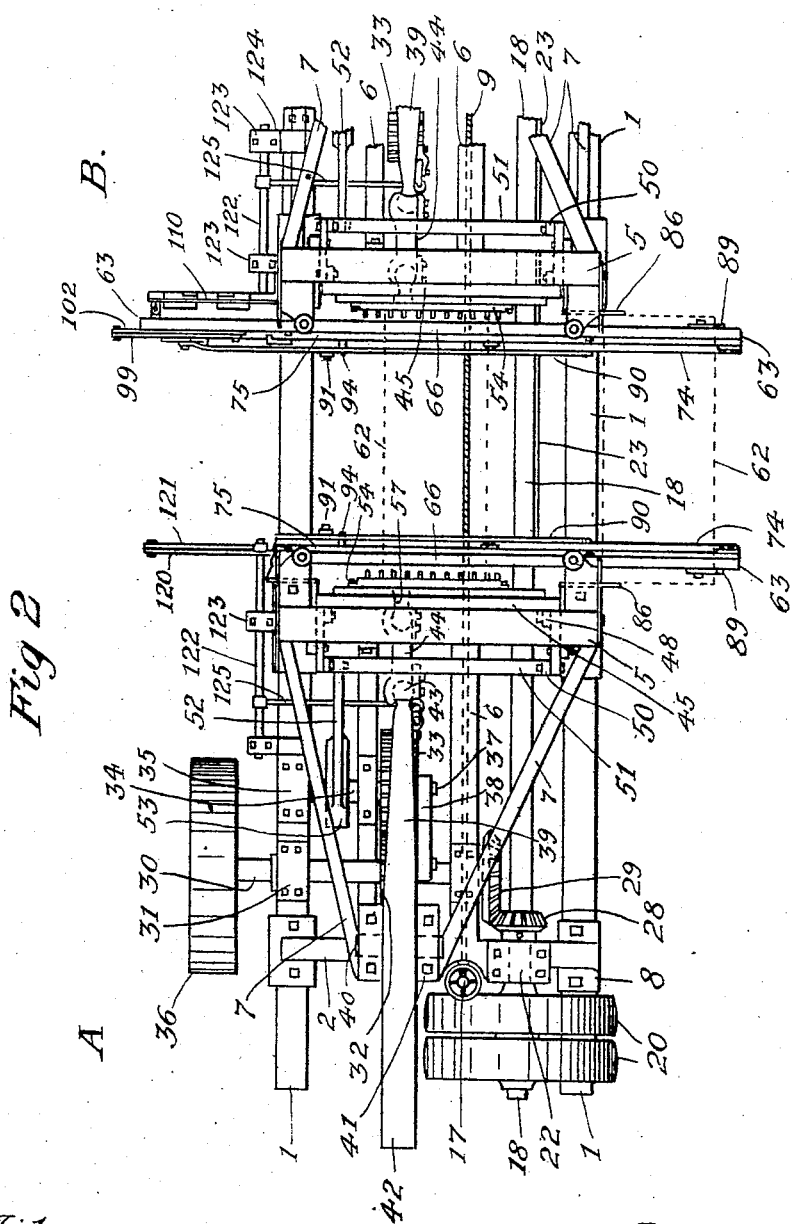
Witnesses:
Theo. Lagaard
H. O. Bowman
Inventor:
John E. Erickson.
By P. H. Gunckel
his Attorney.

No. 854,410. PATENTED MAY 21, 1907.
J. E. ERICKSON.
SELF FEED FOR MORTISE AND TENON SAWING MACHINES.
APPLICATION FILED JAN. 15, 1907.
6 SHEETS—SHEET 3.
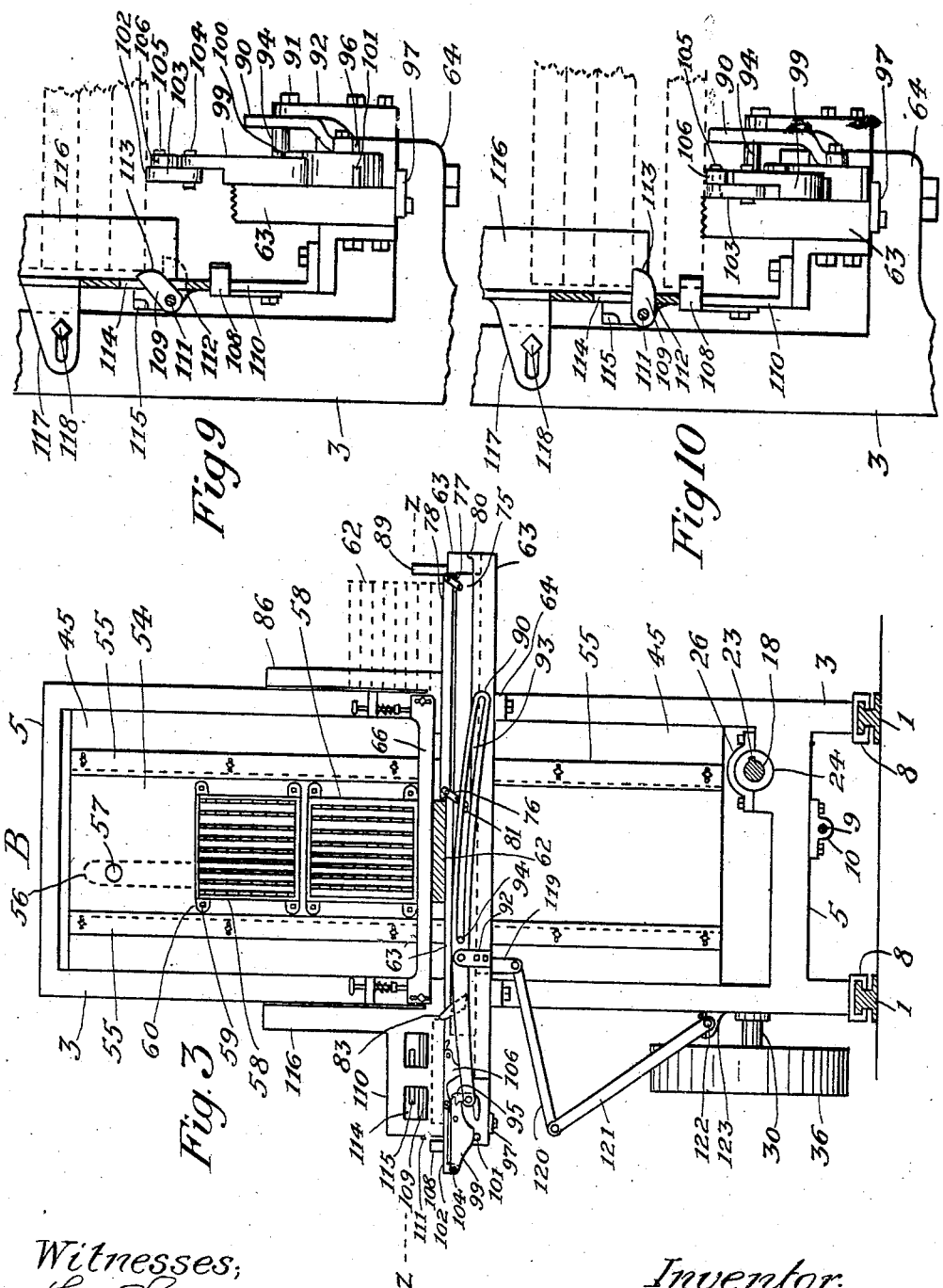
Witnesses:
Theo. Lagaard.
H. A. Bowman.
Inventor:
John E. Erickson,
By P. H. Gunckel
his Attorney.

No. 854,410.
PATENTED MAY 21, 1907.
J. E. ERICKSON.
SELF FEED FOR MORTISE AND TENON SAWING MACHINES.
APPLICATION FILED JAN. 15, 1907.
6 SHEETS—SHEET 4.
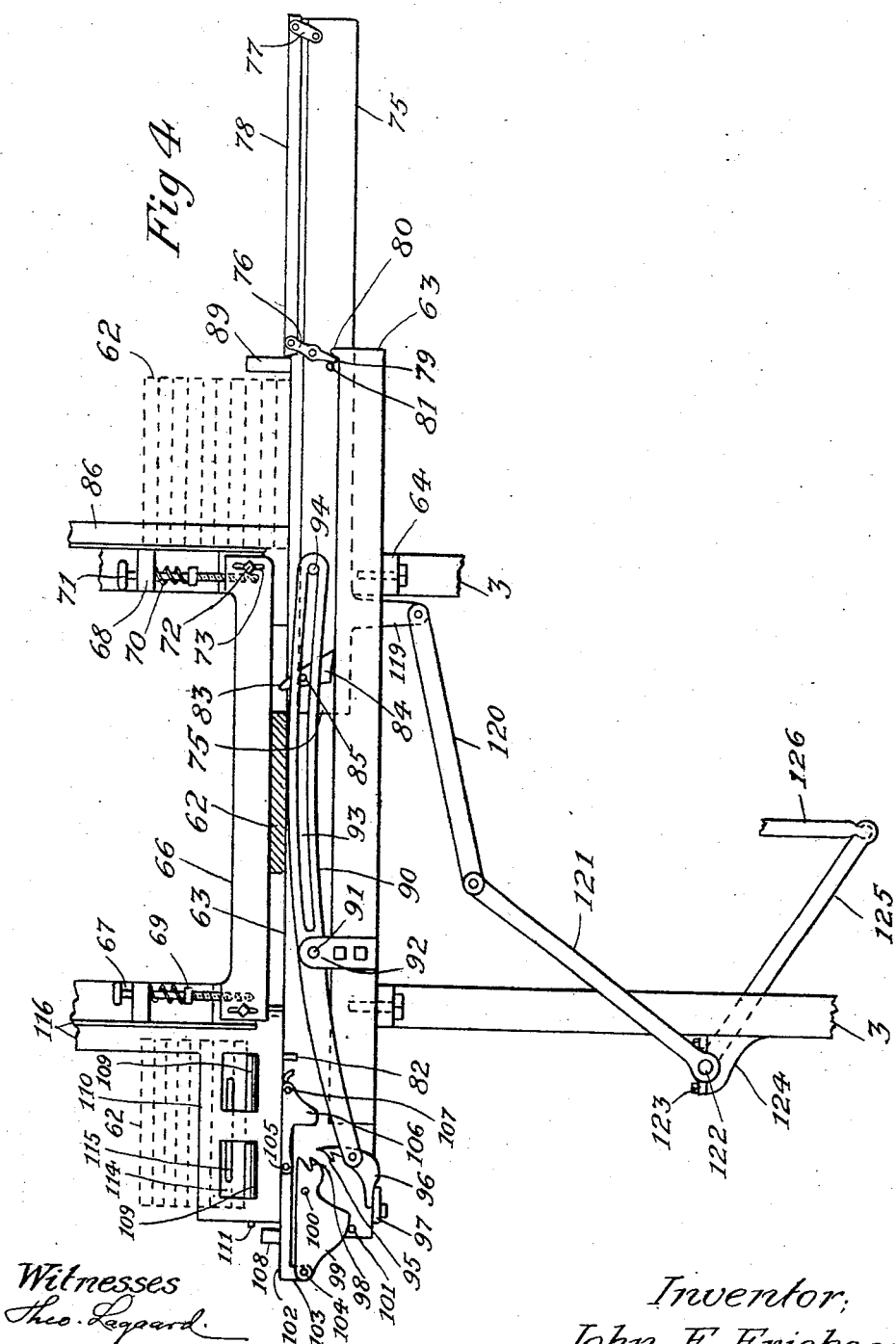
Witnesses
Theo. Leypard.
H. A. Bowman.
Inventor:
John E. Erickson
By P. H. Gunckel
his Attorney.

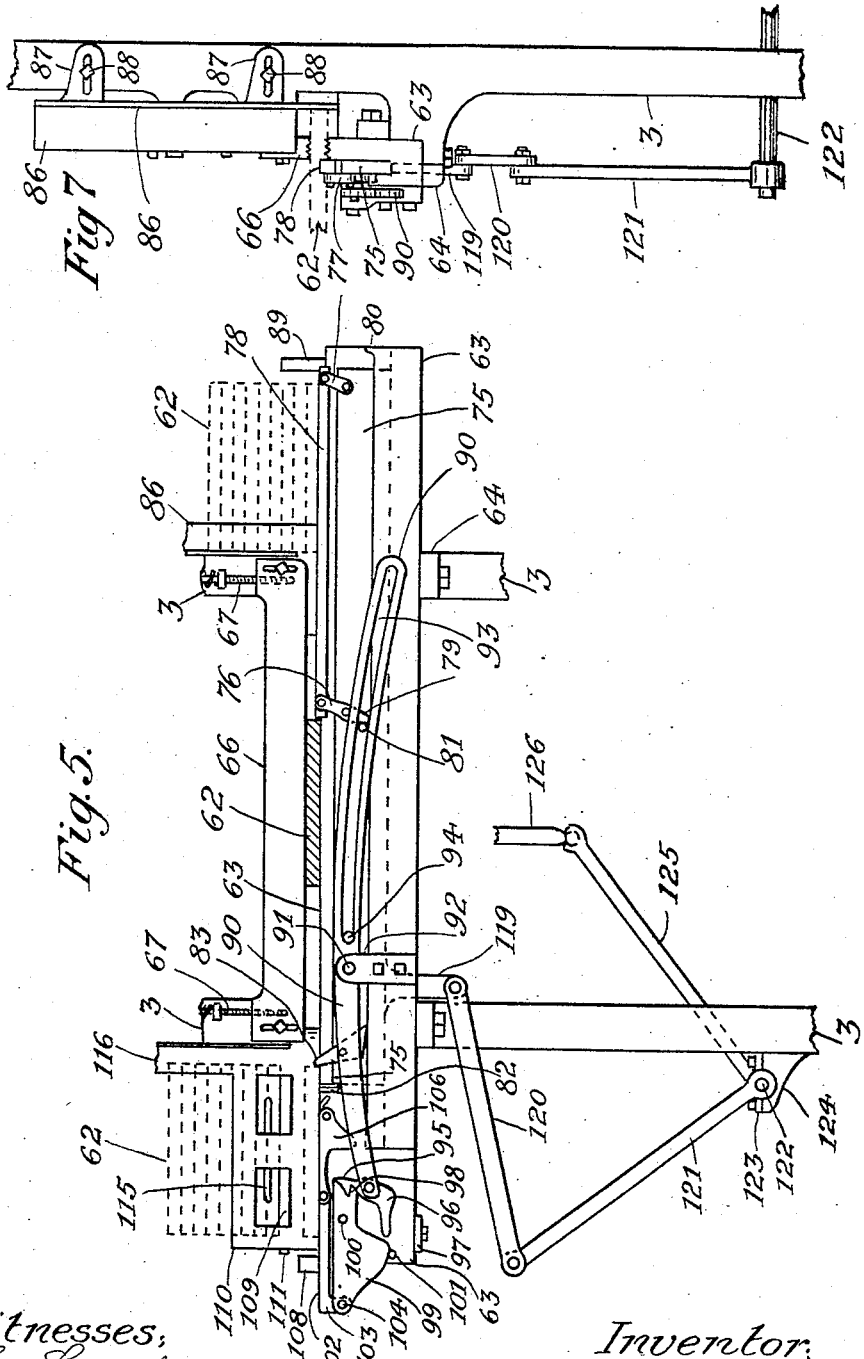

No. 854,410. PATENTED MAY 21, 1907.
J. E. ERICKSON.
SELF FEED FOR MORTISE AND TENON SAWING MACHINES.
APPLICATION FILED JAN. 15, 1907.
6 SHEETS—SHEET 6.
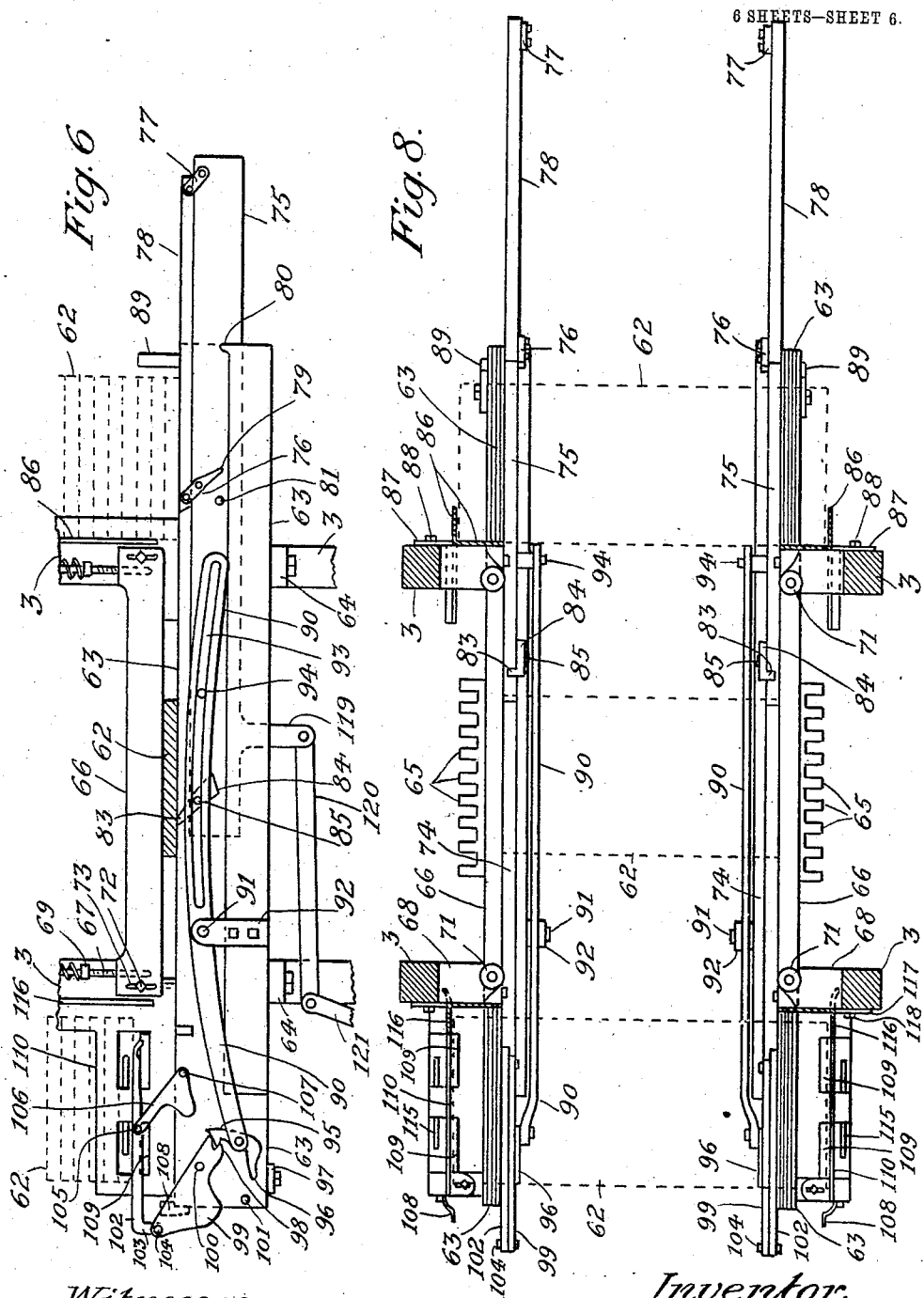
Witnesses;
Theo. Lagaard
H. A. Bowman.
Inventor;
John E. Erickson.
By P. H. Gunckel
his Attorney.

UNITED STATES PATENT OFFICE.

JOHN E. ERICKSON, OF ST. PAUL, MINNESOTA.

SELF-FEED FOR MORTISE AND TENON SAWING MACHINES.

No. 854,410.          Specification of Letters Patent.          Patented May 21, 1907.

Application filed January 15, 1907. Serial No. 352,451.

*To all whom it may concern:*

Be it known that I, JOHN E. ERICKSON, a citizen of the United States, residing at St. Paul, in the county of Ramsey and State of Minnesota, have invented certain new and useful Improvements in Self-Feeds for Mortise and Tenon Sawing Machines, of which the following is a specification.

My invention relates to mechanism for feeding boards to and discharging them from machines for sawing mortises and tenons.

The object of the invention is mainly, to provide an automatic mechanism that will properly feed boards in succession to and conduct them away from the saws. Incidental to this main object is the provision of means for automatically taking the boards one at a time from a pile, presenting them successively to the action of the cutters, and then removing them away and repiling them.

For the purpose of showing a practical application of my improved feed mechanism to a sawing-machine, I have selected for illustration a type of sawing machine in which duplicate sawing mechanisms, operating reciprocating saws, are employed for simultaneously forming mortises or tenons in the ends of a board. But my improvements are applicable to other types of mortising and tenoning machines, and hence I do not wish to limit my claim to a self-feed for the special type of machine illustrated.

My improvements are illustrated in the accompanying drawing, in which—

Figure 1 is a front elevation of a sawing machine equipped with my improved self-feed mechanism; Fig. 2 is a plan view of the same; Fig. 3 is a sectional elevation of the sawing-machine on the line *a—a* of Fig. 1; Fig. 4 shows the board-feeding devices of Fig. 3 on an enlarged scale, but illustrating the positions of parts preparatory to feeding a board; Fig. 5 is a view similar to Fig. 4, but illustrating the positions of the parts at or about the limit of the feed movement; Fig. 6 is a similar view showing the positions of parts while the board-carrier is making its return movement; Fig. 7 is an end elevation of the devices viewed from the right of Fig. 5; Fig. 8 is an enlarged plan view of the duplicate feed mechanisms on the plane of the line *z—z* of Fig. 3; and Figs. 9 and 10 are enlarged detail views of the board-piling devices.

In the machine illustrated in the drawings the base is shown as consisting of two parallel T-shaped bars or rails designated 1. The superstructure comprises two main frame portions one of which is fixed and the other slidable on the rails toward or away from the stationary member. The two frames or members, indicated respectively by A and B, are practically identical in structure and each consists of a pair of posts 2, a pair of higher posts 3, cross-pieces 4 and 5 respectively connecting the posts 2 and 3, and longitudinal and inclined bars 6 and 7 connecting the posts 2 to the posts 3. On the bases of the posts are grooved slides 8 which fit on the rails 1, and these slides for the frame A are bolted to the rails; while those of the frame B are loose and movable on the rails. The object of this construction is to enable an operator to vary the space between the frames to adapt the machine for sawing boards of different widths. Such operation is effected by means of a screw 9 extending lengthwise of the frame and engaging in sleeves 10 attached to the movable frame B. The unthreaded portion, or shank, 11 of the screw-rod is mounted in boxes 12 provided on the stationary frame, and on its end is a miter-gear 13 in mesh with a like gear 14 on the end of an upright rod 15, which is supported in eyes 16. By turning the hand-wheel 17 on the end of the rod 15 the screw can be operated to move the frame B in either direction on the tracks.

The main-shaft 18 extends parallel with the rails 1 and is driven by a belt 19 on one of the pulleys 20. The shaft is mounted in journaled boxes 21 and 22 on cross-pieces of the frame A. Its extended portion is provided with a spline 23 and carries slidable collars 24 and 25 which are journaled in boxes 26 and 27 on cross-pieces of the frame B. The power for operating the saws is transmitted from the main-shaft by bevel pinions 28, one keyed to the shaft adjacent to the box 21 and the other on the collar 25; and these pinions mesh with gears 29 on shafts 30 that are mounted in boxes 31 on the frames. On each shaft 30 is a pinion 32 that meshes with a gear-wheel 33 on a stub-shaft 34 that is journaled in boxes 35 on members of the frame. Each shaft 30 has on the outer end a fly-wheel 36.

To give reciprocatory movements to the saws the gear-wheels 33 are provided with pins 37 to which are connected crank-rods 38 which in turn are pivotally connected to oscillatory levers 39. These levers have their fulcrum bearings 40 in boxes 41 on cross-pieces connecting the posts 2, and have weighted arms 42 extending beyond the fulcrums for counterbalancing the weight of the parts operated by the levers. The upper arms of the levers 39 are connected by ball-and-socket joints 43 to the pitmen 44 that reciprocate the sash-frames.

The saw-carrying devices are mounted on the posts 3. A plate 45 is suspended near its upper and lower ends between the pair of the posts 3 of each frame by means of bell-crank levers 46 that are pivotally connected at 47 to lugs 48 on the plate, and fulcrumed at 49 to lugs on the posts. An upright bar 50 is pivoted to the outer ends of each pair of the levers 46 that are in vertical alinement, and a cross-bar 51 is secured to these bars near their upper ends. To the cross-bar 51 is attached the end of a lifting-bar 52 for rocking the levers 46 to move the plate 45 horizontally forth and back. The lower portion 53 of the bar 52 is widened and forms part of a box which loosely embraces the stub-shaft 34. This portion 53 is recessed and a plate is bolted to it and covers the recess. In the upper and lower portions of the recess are rollers and in the middle portion of the recess is a cam or wiper carried on the stub-shaft 34. In the side walls of this box are vertical slots to permit up and down movements of the lifting-bar. The revolutions of the cam cause its broader portion to alternately engage the upper and lower rollers and thus alternately raise and lower the bar 52, and thereby reciprocate the bars 50 to rock the arms 46 on their fulcrums and thus cause the plate 45 to move forth and back intermittently. The purpose of such movements of the plate is to place the saws in working position for the downward stroke and retract them from the kerfs for the upward stroke.

On the face of the plate 45 are secured guides for the sash-frame carriers 54, which may consist of narrow plates 55 provided with suitable guide-ways for the carriers. To provide space for the operation of the pitman 44 the plate 45 has a vertical slot 56, the walls of which serve as a guide for the reciprocatory movements of the pitman pin 57, which is connected to the upper saw-carrier. The saw-sashes 58 are secured respectively to upper and lower carriers 54 and these carriers are arranged to reciprocate in and be guided by the guide-ways 55. The sash or gates are secured to their carriers by bolts 59 engaging lateral ears 60 on the sash-frames and entering the carrier plates. The carrier plates 54 are connected by a rod 61 so as to reciprocate in unison.

The board 62 to be sawed is supported by shelves or cross-bars 63 extending between brackets 64 on the posts 3 of the frames A and B. On these rails are secured plates having outward tongues 65 corresponding with the tenons or uncut projections on the board and serving to support them during the cutting operation. Over the board is a clamping-bar 66 for holding the board in place on the support. The bar 66 is suspended by rods 67 in brackets 68 on the posts 3 and connected to the opposite ends of the bar. These rods are provided with collars 69, and with coil-springs 70 exerting pressure between the brackets and the collars and thereby pressing the bar downward. The rods are threaded and screwed into the bars by means of hand-wheels 71, for adjusting the clamp toward or away from the bars 62 to accommodate for boards of different thickness. The clamp-bar movements are guided by means of pins 72 and slots 73.

The mechanism for feeding the boards is as follows: On the cross-bars or shelves 63 are formed guide-ways 74 which extend through the machine and project somewhat at the front and rear. A sliding bar 75, constituting the board-carrier, is arranged in each of the guide-ways. To each carrier is pivotally connected by links 76 and 77 a relatively short bar 78 for engaging the board and carrying it along to the position to be sawed. The link 76 has an arm 79 extending downward from its lower pivot in position to engage a lug 80 on the outer portion of the shelf 63 when the carriage is moved outward to the limit of its travel. Such engagement serves to rock the links on their pivots and thus lift the bar 78 to position to engage a board when the carrier is again reciprocated inward. On the carrier, directly in rear of the link arm 79 is a pin 81 which serves as a stop to the movement of the arm and thereby prevents the links from swinging too far outward when the arm strikes the lug 80; and the pin 81 serves also to prevent the links from turning while the carrier is moving inward and thereby serves to hold the feed-bar 78 in its elevated position while pushing a board inward to the sawing point. The inward thrust of the feed-bar is limited by a stop 82 and is only sufficient to carry the board to the sawing point.

For removing a sawed board toward the rear of the machine the carrier is provided near its inner end with a dog 83 that has a weighted lower extension 84 and is connected to the carrier by a pivot-pin 85, so that it may swing and gravitate to nearly upright position when free. The dog is so located that it will stand in front of the edge of the board that is being sawed and be in position to carry the board toward the rear of the machine when the carrier is moved inward to feed another board to position to be sawed. Then when the carrier is retracted the upper portion of the dog will engage the under surface of the board at the sawing point and be swung on its pivot until it has passed the board and then will again swing on its pivot to operative position.

The boards may be placed singly on the shelves in position to be engaged by the carrier, but it is preferable to pile them and allow the carrier bars 78 to engage and move the under board of the pile, as indicated in the drawings. For properly piling and guiding the boards vertical standards or guides 86 having slotted ears 87 are adjustably attached to the posts 3 by means of bolts 88; and other adjustable standards 89 are provided near the front ends of the shelves 63.

It should be understood that while the saws are on the up-stroke the board-carrier feeds in a board to the sawing point between the shelves 63 and the clamp 66 to be operated upon by the next down-stroke of the saws. During the down-stroke of the saws the carrier is moved outward to pick up another board from the pile and upon completion of the sawing the saws again recede from the kerfs and are moved upward and while they are so moving the carrier pushes the sawed board rearward and presents another board in position to be sawed.

For piling the boards after they have been sawed the following devices are employed. A lever 90 is fulcrumed at 91 to a support 92 attached to the bar 63, and is free to swing in a vertical plane. In the longer or forward arm of the lever is a long curved slot 93; and projecting through this slot is a pin 94 that is fixed to the board-carrier 75 and travels in the slot as the carrier reciprocates. As the carrier and the pin 94 travel on horizontal planes and the slot in which the pin moves is curved, it will be obvious that such movements will rock the lever 90 on its fulcrum and thereby lower its rearward arm when the pin is at the outer end of the slot (as shown in Fig. 3), and permit the longer arm to gravitate and raise the shorter or rear arm when the pin is at or near the inner end of the slot (as shown in Fig. 5). A gravitating pawl 95 is pivoted to the side of the rear arm of the lever 90 and has on its weighted lower portion a rearward projection 96 which serves to limit the gravitating movement of the pawl by striking a stop 97 provided on the bar 63. The pawl 95 is arranged in position to engage a lip 98 on the shorter arm of a lever 99 that is fulcrumed at 100 to the bar 63, for the purpose of lifting the longer arm of the lever. The descent of the latter arm is limited by a stop 101. Above the lever 99 is a horizontal bar 102, serving as the board-lifter, and it has at its outer end a depending arm 103 that is pivoted at 104 to the longer arm of the lever 99. Near its middle this board-lifter is connected by a pivot-pin 105 to a weighted swinging bar 106 that in turn is connected by a pivot-pin 107 to the shelf-bar 63, for the purpose of maintaining the board-lifter in horizontal position during its up and down movements.

When the inward thrust of the board-carrier moves the sawed board rearward to position on the lifter 102 the further rearward movement of the board is prevented by a stop 108, which preferably is a spring that will enable the operator to pull out the board in case of necessity. The board-carrier movement in so presenting the board shifts the pin 94 to the rear end of the slot 93, thereby permitting the lever 90 to gravitate and raise the pawl 95 to engagement with the lip 98 on the lever 99. Then when the board-carrier makes its return or forward reciprocation the pin 94, traveling in the slot 93, will raise the forward arm of the lever 90 and depress its rear arm, which movement will serve to actuate the pawl and rock the lever 99 on its fulcrum to raise the lifter 102 together with the board it supports.

As a board is lifted by the lifter 102 it contacts with the under surface of a pair of board-supports 109. These supports are mounted on a frame-piece 110, which is attached to the post 3, and are hinged thereto by a pintle 111, which permits them to gravitate to horizontal positions on stops 112. The outer portions of their under surfaces are rounded or beveled, as shown at 113, and the board contacts with these rounded surfaces and slides thereon as it rises and turns the supports upward on their hinged connections. The frame-piece 110 has openings 114 for receiving the supports when they are turned upward to vertical position, and stops 115 prevent them from passing outward beyond vertical positions. When the lifter has raised the board and turned the supports to vertical positions and the board has passed out of contact, the supports then gravitate to horizontal positions on their stops and are ready to receive and support the board when the lifter is retracted. The pile of boards that may be on the supports at the time a board is raised by the lifter will also be lifted, as indicated in the drawings. An adjustable corner-guide 116 for the pile of finished boards is secured to the post 3 by means of a slotted ear 117 and an adjusting bolt 118. As the lifter reaches that position the pawl will slip out of engagement with the lever 99 and the lifter will descend by gravity, and be in position to receive the next sawed board.

The board-carriers are operated in the following manner. To a depending bracket 119 on the carrier near its rear end is pivoted one end of a rod 120 the other end of which is pivoted to a rod 121. The lower end of the latter rod is made fast to a rock-shaft 122 that is journaled in boxes 123 on brackets 124 provided on the machine frame. To the rock-shaft is also attached a rod 125 the other end of which is pivotally connected to another rod 126 which in turn is pivotally connected to the upper portion of the rocking-lever 39. The oscillatory movements of the lever 39 serve to rock the shaft 122 and thereby swing the rods 121 and 120 transversely of the machine and thus reciprocate the board-carrier inward and outward. The inward movement of the carrier for feeding a board to position to be sawed takes place while the saws are being moved upward by the operation of the lever 39; and the outward movement of the carrier for placing it in position to feed another board is effected by the downward movement of the lever 39 for operatively reciprocating the saws.

In operating the machine the plate 45 remains stationary during the downward reciprocation of the sash-frame, so that the movement of the latter is in a vertical plane parallel with the face of the plate. Upon completion of such movement and during the return reciprocation the operation of the cam on the shaft 34 withdraws the saws from the kerfs by retracting the plate 45. While the saws are on the up-stroke the board-carrier feeds in a board to the sawing point between the shelves 63 and the clamps 66 to be operated upon by the next down-stroke of the saws. During the down-stroke of the saws the carrier is moved outward to pick up a second board from the pile and upon completion of the sawing the saws again recede from the kerfs and are moved upward and while they are so moving the carrier pushes the sawed board to the lifter 102 and presents a third board in position to be sawed. The return movement of the carrier after presenting the second board causes the lifter to lift and deposit the first board upon the supports 109; and the next return movement of the carrier after presenting the third board causes the lifter to raise the second board, and along with it the first board, to position on the board supports; and so on.

Having described my invention, what I claim and desire to secure by Letters Patent is—

1. The combination with a machine for sawing mortises or tenons, provided with reciprocating saws arranged to recede laterally upon completion of a cut, of an automatic feed mechanism for presenting and holding a board stationary at the sawing point and for conducting it away after it has been sawed, substantially as set forth.

2. The combination with a machine for sawing mortises or tenons, of means for moving the saws to and away from the sawing point, mechanism for presenting and holding a board stationary at the sawing point and for conducting away the sawed boards, and automatic means for piling them by elevating and supporting them, substantially as set forth.

3. The combination with a machine for sawing mortises or tenons, of means for moving the saws to and away from the sawing point, mechanism for presenting and holding a board stationary at the sawing point and for conducting away the sawed boards, devices actuated by the carrier movements for lifting the discharged boards, and means for supporting them when elevated, substantially as set forth.

4. In a machine for sawing mortises or tenons, a work-holder for holding a board stationary, a gang of saws, means for moving them downward in a vertical plane, means for causing them to recede horizontally for their upward movement, and automatic means for feeding a board transversely to the cutting planes of the saws to and removing it from the work-holder, substantially as set forth.

5. In a machine for sawing mortises or tenons, a work-holder for holding a board stationary, a gang of saws, means for moving them downward in a vertical plane, means for causing them to recede horizontally for their upward movement, and an automatic feed mechanism adapted to move transversely to the cutting planes of the saws one board away from and present another board to the work-holder during each upward movement of the saws, substantially as set forth.

6. In a machine for sawing mortises or tenons, a work-holder for holding a board stationary, a gang of saws, means for moving them downward in a vertical plane, means for causing them to recede horizontally for their upward movement, and an automatic feed mechanism adapted to move transversely to the cutting planes of the saws one board away from and present another board to the work-holder during each upward movement of the saws, and adapted also to pile the boards that it removes from the work-holder, substantially as set forth.

7. In a machine for sawing mortises or tenons, a work-holder, a self-feed mechanism adapted to simultaneously move one board away from and move another to the work-holder, and means actuated by the return carrier movements for lifting the discharged boards and piling them above the plane of the carrier movements, substantially as set forth.

8. A self-feed mechanism for a sawing-machine, comprising a board-carrier, means for reciprocating it, means for causing its feeding reciprocation to move one board away from and another to the sawing point, a lifting device actuated by the carrier for elevating the discharged boards to pile them, and means for holding the pile in suspension, substantially as set forth.

9. In a machine of the class described, duplicate sawing mechanisms for simultaneously sawing both ends of a board, work-holders therefor, and a self-feed mechanism composed of duplicate parts connected to the respective sawing-machine frames, and comprising reciprocating board-carriers and means attached thereto for moving a board to and away from the work-holders, and means actuated by the return carrier movements for lifting the discharged boards and piling them above the plane of the carrier movements, substantially as set forth.

10. In a machine of the class described, duplicate sawing mechanisms for simultaneously sawing both ends of a board, work-holders therefor, and a self-feed mechanism composed of duplicate parts connected to the respective sawing-machine frames, and comprising reciprocating board-carriers and means attached thereto for moving a board to and away from the work-holders, lifting devices actuated by the carrier for elevating the discharged boards to pile them, and means for holding the pile in suspension, substantially as set forth.

11. In a machine of the class described, duplicate sawing mechanisms for simultaneously sawing both ends of a board, and arranged to recede laterally upon completion of a cut, and an automatic feed mechanism composed of duplicate parts for presenting and holding a board stationary at the sawing point and for conducting it away after it has been sawed, substantially as set forth.

In testimony whereof I have signed my name to this specification in the presence of two subscribing witnesses this 22d day of December, 1906.

JOHN E. ERICKSON.

Witnesses:
  P. H. GUNCKEL,
  H. A. BOWMAN.